(12) United States Patent
Linguanti et al.

(10) Patent No.: US 11,452,942 B2
(45) Date of Patent: Sep. 27, 2022

(54) DYNAMIC QUEST-BASED NARRATIVE FOR AMUSEMENT PARK

(71) Applicant: Universal City Studios LLC, Universal City, CA (US)

(72) Inventors: Nicholas Anthony Linguanti, Orlando, FL (US); Richard Michael Spencer, Longwood, FL (US); Thomas John Mannarino, Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 307 days.

(21) Appl. No.: 16/661,743

(22) Filed: Oct. 23, 2019

(65) Prior Publication Data
US 2021/0016185 A1    Jan. 21, 2021

Related U.S. Application Data

(60) Provisional application No. 62/874,369, filed on Jul. 15, 2019.

(51) Int. Cl.
| | |
|---|---|
| *A63F 13/80* | (2014.01) |
| *A63F 13/48* | (2014.01) |
| *A63F 13/65* | (2014.01) |
| *A63F 13/69* | (2014.01) |
| *A63G 31/00* | (2006.01) |

(52) U.S. Cl.
CPC .............. *A63F 13/80* (2014.09); *A63F 13/48* (2014.09); *A63F 13/65* (2014.09); *A63F 13/69* (2014.09); *A63G 31/00* (2013.01); *A63F 2300/205* (2013.01); *A63F 2300/8094* (2013.01)

(58) Field of Classification Search
CPC .......... A63F 13/80; A63F 13/48; A63F 13/65; A63F 13/69; A63G 31/00
See application file for complete search history.

(56) References Cited

U.S. PATENT DOCUMENTS 6,932,698 B2    8/2005   Sprogis
6,967,566 B2 * 11/2005   Weston .................. A63F 13/80
                                                          340/323 R (Continued)

OTHER PUBLICATIONS

Sorcerers of the Magic Kingdom, May 8, 2019, 2 pages, https://disneyworld.disney.go.com/attractions/magic-kingdom/sorcerers/.

(Continued)

*Primary Examiner* — William H McCulloch, Jr.
*Assistant Examiner* — Ankit B Doshi
(74) *Attorney, Agent, or Firm* — Fletcher Yoder, P.C.

(57) ABSTRACT

A dynamic quest-based experience system of an amusement park includes a memory storing instructions and a processor configured to execute the instructions to cause the processor to receive a user input from a computing device indicative of starting a dynamic quest-based narrative, in which the dynamic quest-based narrative includes a plurality of sets of information. The instructions further cause the processor to place an identifier associated with the computing device in a virtual queue associated with a narrative endpoint of the amusement park, select a set of information from the plurality of sets of information based on a determined parameter, wherein the set of information is associated with a requested task, and output the set of information to the computing device.

20 Claims, 7 Drawing Sheets

(56) References Cited

U.S. PATENT DOCUMENTS

| | | | |
|---|---|---|---|
| 8,082,165 B2 | 12/2011 | Natsuyama et al. | |
| 8,313,381 B2 | 11/2012 | Ackley et al. | |
| 8,608,535 B2 | 12/2013 | Weston et al. | |
| 10,974,135 B2* | 4/2021 | Aman | A63F 13/25 |
| 2003/0107178 A1* | 6/2003 | Weston | A63F 9/0613 |
| | | | 273/459 |
| 2009/0267728 A1 | 10/2009 | Mayrand | |
| 2010/0308964 A1 | 12/2010 | Ackley et al. | |
| 2013/0130786 A1 | 5/2013 | Robbins et al. | |
| 2014/0113674 A1* | 4/2014 | Joseph | H04W 4/021 |
| | | | 455/519 |
| 2016/0136529 A1* | 5/2016 | Weston | A63G 21/18 |
| | | | 472/117 |
| 2017/0200319 A1 | 7/2017 | Popkey et al. | |
| 2018/0365600 A1 | 12/2018 | Carrier et al. | |

OTHER PUBLICATIONS

Toye, Eleanor et al., Interacting with Mobile Services: An Evaluation of Camera-Phones and Visual Tags, Springer-Verlag London Limited 2006, Jan. 24, 2007, vol. 11, No. 2, pp. 97-106.

PCT/US2020/041001 Invitation to Pay Additional Fees Sep. 11, 2020.

* cited by examiner

DYNAMIC QUEST-BASED NARRATIVE FOR AMUSEMENT PARK

CROSS REFERENCE TO RELATED APPLICATIONS

This application claims priority from and the benefit of U.S. Provisional Application Ser. No. 62/874,369, entitled "DYNAMIC QUEST-BASED NARRATIVE FOR AMUSEMENT PARK," filed Jul. 15, 2019, and is hereby incorporated by reference.

BACKGROUND

The present disclosure relates generally to the field of amusement parks. Specifically, embodiments of the present disclosure are related to techniques to manage respective wait times at various attractions of an amusement park.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be noted that these statements are to be read in this light, and not as admissions of prior art.

Amusement parks are continuously growing in popularity and often have a high number of guests at any given time. As a result, certain attractions of an amusement park may be consistently at capacity. For this reason, guests may have to wait in a queue area (e.g., queue line) before experiencing the attraction. The guests may be provided with limited entertainment while waiting in the queue area. For example, guests may physically line up (e.g., stand) in the queue area until it is their turn to take part in the attraction. Thus, waiting in the queue line may reduce the enjoyment of guests at the amusement park. Additionally, the guests would not be able to spend time at other attractions while waiting in the queue area. As such, the experience of each guest may be limited by waiting in queue areas.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a dynamic quest-based experience system of an amusement park includes a memory storing instructions and a processor configured to execute the instructions to cause the processor to receive a user input from a computing device indicative of starting a dynamic quest-based narrative, in which the dynamic quest-based narrative includes a plurality of sets of information. The instructions further cause the processor to place an identifier associated with the computing device in a virtual queue associated with a narrative endpoint of the amusement park, select a set of information from the plurality of sets of information based on a determined parameter, wherein the set of information is associated with a requested task, and output the set of information to the computing device.

In one embodiment, an amusement park system includes a dynamic quest-based experience system configured to receive an input transmitted from a computing device of a user at an initial time, in which the input is indicative of starting a dynamic quest-based narrative, place the user in a virtual queue associated with an endpoint of the quest-based narrative, and determine a desired time for the user to arrive at a location of the endpoint of the quest-based narrative, in which the desired time is based on an availability at the endpoint. The dynamic quest-based experience system is further configured to select a series of tasks to be completed by the user, in which the series of tasks is selected such that an estimated time to complete the series of tasks corresponds with a difference between a current time and the desired time, and output instructions associated with a task of the series of tasks to the computing device. The amusement park system also includes at least one interactive element associated with the task, in which the interactive element is configured to provide feedback to the dynamic quest-based experience system indicative of completion of the task.

In one embodiment, a controller for an amusement park system includes a tangible, non-transitory, computer-readable medium having computer-executable instructions stored thereon that, when executed, are configured to cause one or more processors to receive a user input from a computing device of a guest group of the amusement park system, in which the user input is indicative of starting a dynamic quest-based narrative, and the dynamic quest-based narrative comprises a plurality of sets of information. The computer-executable instructions are further configured to place the guest group in a virtual queue associated with a narrative endpoint of the amusement park, select a set of information from the plurality of sets of information based on a determined parameter, in which the set of information is associated with a task of a series of tasks, and output the set of information to the computing device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
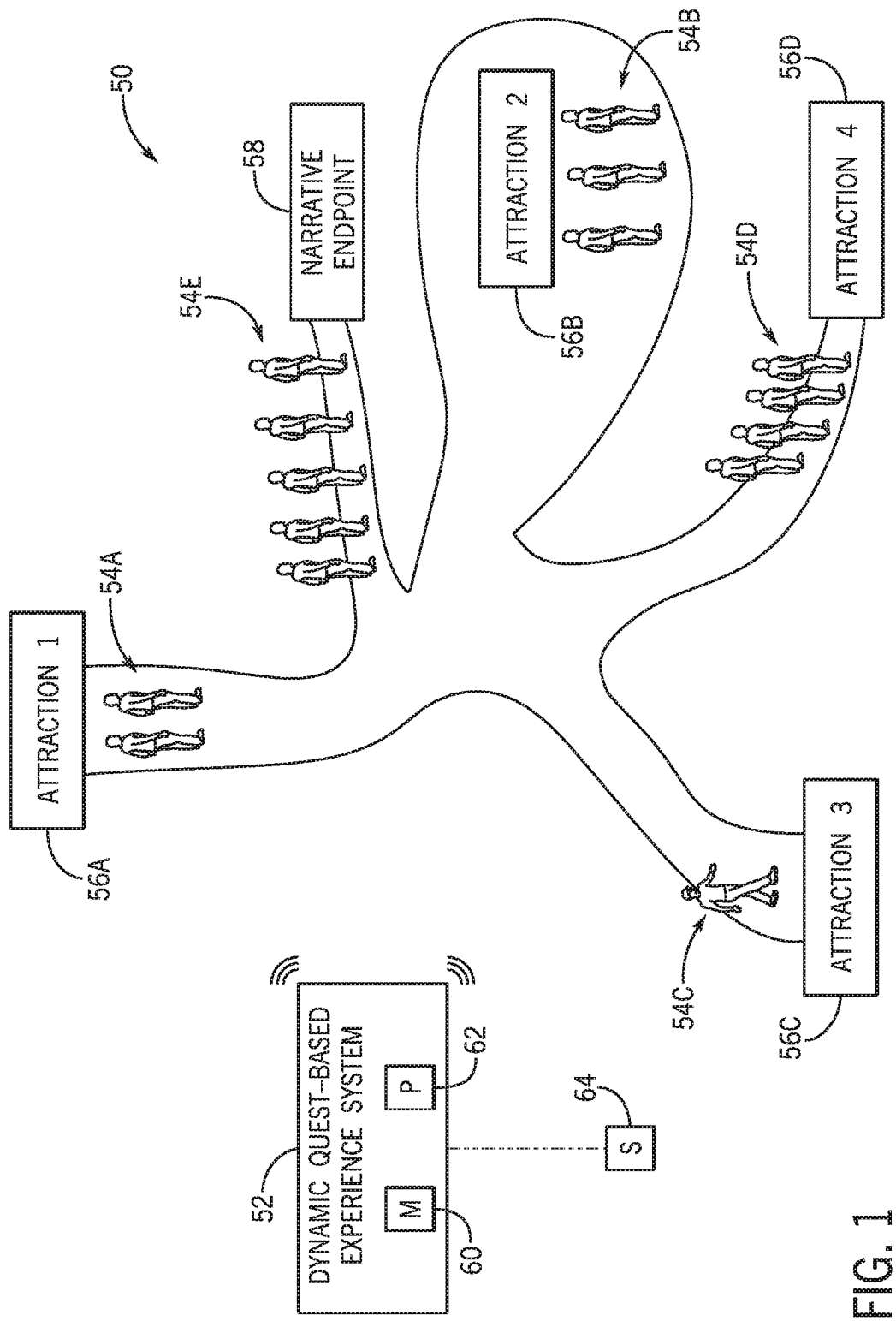
FIG. 1 is a schematic view of an embodiment of an amusement park having a dynamic quest-based experience system configured to manage wait times of certain attractions of the amusement park, in accordance with an aspect of the present disclosure.

One or more specific embodiments of the present disclosure will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

An amusement or theme park may have many attractions to entertain a variety of guests. For example, the attractions may include a roller coaster, a log flume, a performance show, a character meet-and-greet, and the like. Each attraction is limited in capacity. In other words, each attraction may have a certain number of available spots to accommodate a threshold amount of guests of the amusement park. If the number of available spots has been filled, additional guests may have to wait until another available spot has opened before experiencing the attraction. As an example, for a roller coaster attraction, available spots may open when a train of the roller coaster attraction completes a track circuit. Passengers of the train will then disembark to enable the train to receive other guests.

As the amusement park becomes more popular, the average number of guests that visit the amusement park each day will increase. For this reason, multiple attractions of the amusement park will be at capacity at any given day, thereby causing guests to wait to experience such attractions. In particular, some attractions, such as character meet-and-greets, may have a very limited capacity and guests may have a long wait time before being able to experience the attraction. Each attraction may have a queue area, such as a line, where guests may physically wait. The queue area may provide entertainment, such as music and/or video display, for the guests. However, such entertainment may not adequately entertain guests, and the guests may feel bored while waiting in the queue area. As such, waiting in the queue area may limit the experience of guests. Additionally, guests will not be able to experience other attractions when having to be physically present in the queue area, further limiting the experience of the guests. In some cases, certain guests may not be willing to wait to experience certain attractions. The guests may therefore bypass such attractions during their visit to the amusement park. Providing a positive overall experience for amusement park guests entails addressing issues related to managing wait times associated with certain attractions. In some cases, guests can be deterred from returning to a particular amusement park due to negative experiences associated with long wait times.

It is now recognized that limiting the wait times associated with certain attractions may provide a more positive overall experience for guests at an amusement park. Thus, the present disclosure is directed toward a system that virtually places a guest or a group of guests in queue for a particular attraction or attractions and that provides activities for the guests while the guests are in queue. For example, the guests may use a computing device to communicate with the system and initiate a quest-based narrative that places the guests in a virtual queue line for a particular attraction. The system may then communicate with the computing device to provide various activities that the guests may complete in the quest-based narrative prior to going to the attraction. The activities may be provided in a storyline form that delivers a more interactive and enjoyable experience to the guests. As an example, the system may provide certain clues or instructions to the computing device, and the guests would use the provided clues or instructions to complete a task. The clues and/or tasks may be associated with a particular objective (e.g., solving a mystery) and/or with a certain theme (e.g., a noir setting) to provide a more immersive experience. Furthermore, the activities may be dynamically selected based on certain parameters of the amusement park and/or the guests. In this manner, the system may provide a variety of different and more personalized activities to the guests that encourages the guests to participate in the quest-based narrative. Thus, the quest-based narrative entertains the guests as they wait in the virtual queue.

By providing a quest-based narrative with flexible and variable tasks, an amusement park may dynamically control arrival of guests to a desired end attraction at a desired time. In this manner, the quest-based narrative serves as an invisible queue by directing guests to locations that may be distributed throughout an amusement park over the course of the narrative and causing the guests to convene at the end attraction at a particular time. Further, the guests experience the queue as a fun activity. Still further, the amount of time spent on the quest-based narrative is dynamic, allowing certain guests to be pushed forward (i.e., reduce the amount of time spent on the quest-based narrative) or held back (i.e., increase the amount of time spent on the quest-based narrative) in the virtual queue to accommodate capacity in the desired end attraction in a manner that is imperceptible to the guests themselves. Because certain types of attractions, such as character meet-and-greets, can be flexible within a range of time (e.g., 5-20 minutes), the quest-based narrative can respond in real-time to variability in the attraction throughput. For example, if one guest or guest group spends only five minutes at the character meet-and-greet rather than an allotted 15 minutes, the system updates the queue by pushing forward the subsequent guests ahead of schedule and/or by selecting a nearest available guest to proceed to the character meet-and-greet location so that the character is not idle and waiting for a next guest. In this manner, high value and low capacity attractions may be maintained at maximum capacity throughout the day to permit as many guest interactions as possible while also avoiding having guests wait at such attraction in long lines.

Turning now to the drawings, FIG. 1 is a schematic view of an embodiment of an amusement park 50 having a dynamic quest-based experience system 52 configured to manage wait times of certain attractions of the amusement park 50. The dynamic quest-based experience system 52 may be in communication with (e.g., wirelessly coupled to) various guest groups 54 (e.g., to at least one respective computing device of the guest groups 54) that are visiting the amusement park 50 and are at various attractions 56 of the amusement park 50. As described herein, each guest group 54 may include a single guest or multiple guests that are associated with one another, such as families, friends, work colleagues, and the like, who are generally visiting the attractions 56 together. The illustrated amusement park 50 includes a first guest group 54A at a first attraction 56A, a second guest group 54B at a second attraction 56B, a third guest group 54C at a third attraction 56C, a fourth guest group 54D at a fourth attraction 56D, and a fifth guest group 54E at a location associated with a narrative endpoint 58. However, the amusement park 50 may include any number of guest groups 54 at any number of attractions 56. Each guest group 54 may communicate with the dynamic quest-based experience system 52 to participate in a quest-based narrative provided by the dynamic quest-based experience system 52.

In an embodiment, the dynamic quest-based experience system 52 may include and/or be communicatively coupled with a controller configured to facilitate providing the quest-based narrative. The controller may have a memory 60 and a processor 62. The memory 60 may include volatile memory, such as random access memory (RAM), and/or non-volatile memory, such as read-only memory (ROM), optical drives, hard disc drives, solid-state drives, or any other non-transitory computer-readable medium that includes instructions to operate the dynamic quest-based experience system 52, such as to provide information to the guest groups 54. The processor 62 may be configured to execute such instructions. For example, the processor 62 may include one or more application specific integrated circuits (ASICs), one or more field programmable gate arrays (FPGAs), one or more general purpose processors, or any combination thereof.

The quest-based narrative provided by the dynamic quest-based experience system 52 may entertain the different guest groups 54 before they experience the narrative endpoint 58, which may be a reward, attraction, or other desirable feature associated with the amusement park 50. In one embodiment, the narrative endpoint 58 may be a limited capacity attraction that is popular with the guests visiting the amusement park 50. In an additional or an alternative embodiment, the narrative endpoint 58 may be a discount, an access to a restricted area of the amusement park 50, a special edition of one of the attractions 56, a souvenir, another suitable reward, or any combination thereof. The narrative endpoint 58 may be associated with one or more endpoint locations to which the guest groups 54 are directed to arrive at an estimated time or time range that is consistent with an estimated time associated with completing the selected quest-based narrative of the dynamic quest-based experience system 52 and traveling to the endpoint location of the narrative endpoint 58.

Each of the guest groups 54 may communicate with the dynamic quest-based experience system 52 to be placed in a virtual queue of the narrative endpoint 58. Upon placing the guest groups 54 in the virtual queue (e.g., in the order that the guest groups 54 communicated with the dynamic quest-based experience system 52), the dynamic quest-based experience system 52 may also initiate a respective unique quest-based narrative to each guest group 54. Each quest-based narrative includes various sets of information that may each be associated with a requested task to be completed by the guest group 54. The tasks may be completed in series, with a next set of information being provided only after the task associated with the previous set of information is complete. Accordingly, because each task is provided on an as-needed basis rather than as an itinerary to the guest or guests of the guest group 54, the set of tasks may be changed to accommodate changes in capacity or throughput at the narrative endpoint 58 without confusing the guests. For example, when the narrative endpoint 58 is experiencing a delay, the dynamic quest-based experience system 52 may add extra tasks. When the narrative endpoint 58 is running ahead of schedule, the dynamic quest-based experience system 52 my remove certain tasks. The dynamic quest-based experience system 52 may perform all of the adjustments without the guests being aware of the changes and, therefore, without being aware of changes in estimated times associated with reaching the narrative endpoint 58.

The dynamic quest-based experience system 52 may select the series of tasks and associated task-related sets of information to provide to the guest group 54 based on a determined parameter. The guest group 54 may then work to complete the requested task associated with the provided set of information. Upon completion of the requested task, the dynamic quest-based experience system 52 may select another set of information associated with another requested task to be presented to the guest group 54 as based on an updated determined parameter. Thus, the dynamic quest-based experience system 52 may continuously provide the guest group 54 with requested tasks as the guest group 54 is in the virtual queue to entertain the guest group 54, and such requested tasks may be more personalized to provide a more interactive dynamic quest-based narrative.

Generally, the dynamic quest-based narrative occupies the guest group 54 until the guest group 54 has progressed through the virtual queue to reach a location associated with the narrative endpoint 58 at a desired time. For example, the virtual queue may have an associated wait time that is to elapse before the guest group 54 may proceed to the narrative endpoint 58 at the desired time. The dynamic quest-based narrative may provide the guest group 54 with activities until that wait time has elapsed. The wait time may be associated with an available slot in capacity for the narrative endpoint 58. In this manner, the guest group 54 can wait to experience the narrative endpoint 58 without having to sacrifice spending time at other regions or attractions 56 of the amusement park 50. Furthermore, the guests of the guest group 54 may be entertained while waiting by performing various activities that may include a puzzle, a survey, a quiz, a scavenger hunt, and the like. Thus, the dynamic quest-based experience system 52 may increase the overall experience of guests visiting the amusement park 50.

In one embodiment, the dynamic quest-based experience system 52 may be communicatively coupled to a sensor 64 configured to determine the parameter used by the dynamic quest-based experience system 52 to determine which set of information to provide the guest group 54. The parameter may be associated with the amusement park 50 and may include a time of day, a weather condition, a population density of a region in the amusement park 50, and so forth. Additionally or alternatively, the dynamic quest-based experience system 52 is configured to receive the parameter from each guest group 54 (e.g., via the respective computing devices) and the parameter may include a number of guests in each guest group 54, a location of each guest group 54, and the like. Based on the parameter of the amusement park 50 and/or the parameter of each guest group 54, the dynamic quest-based experience system 52 may select a particular task or activity for the guest group 54 to complete.

Each requested task of the dynamic quest-based narrative may cause the guest group 54 to navigate through various regions of the amusement park 50 to reach one or more task locations, which may include the attractions 56, retail establishments, decorative features, etc. Each task may be associated with only a single possible task location or with multiple possible task locations. Once at the task location, the respective guest groups 54 may search for a certain element (e.g., a prop or décor) of the amusement park 50. The element may be interactive, as discussed herein. The requested tasks may include having the guest group 54 answer a question associated with the element, take a photo of the element, interact with the element, and the like. After the wait time has elapsed, the dynamic quest-based experience system 52 may then cause the guest group 54 to navigate to the narrative endpoint 58. In other words, after the guest group 54 has completed various tasks of their dynamic quest-based narrative to complete the wait time of the guest group 54, the dynamic quest-based experience system 52 rewards the guest group 54 with the narrative endpoint 58. In one embodiment, the guest group 54 does not know they are in the virtual queue for the narrative endpoint 58. That is, the guest group 54 may select to participate in a particular dynamic quest-based narrative without knowing the associated narrative endpoint 58. Thus, the narrative endpoint 58 may be a surprise, which may further motivate the guest group 54 to complete the requested tasks in anticipation of obtaining the narrative endpoint 58.

In one example, the first guest group 54A may communicate with the dynamic quest-based experience system 52 to initiate a dynamic quest-based narrative. In response, the dynamic quest-based experience system 52 may evaluate the wait time related to the narrative endpoint 58. In its evaluation, the dynamic quest-based experience system 52 may determine that the fifth guest group 54E is currently at the narrative endpoint 58 and that the second guest group 54B may proceed to the narrative endpoint 58 after the fifth guest group 54E has finished. Thus, the dynamic quest-based experience system 52 may place the first guest group 54A behind the second guest group 54B, which may be participating in a different dynamic quest-based narrative. In an example embodiment, upon initiation of the dynamic quest-based narrative of the first guest group 54A, the dynamic quest-based experience system 52 may estimate when both the second guest group 54B and the fifth guest group 54E will have finished at the narrative endpoint 58 to estimate a wait time for the first guest group 54A, and the dynamic quest-based experience system 52 may provide the first guest group 54A with a requested task based on the estimated wait time. For instance, if the estimated wait time is long, the dynamic quest-based experience system 52 may provide a requested task that would lead the first guest group 54A away from the narrative endpoint 58, such as toward the third attraction 56C or the fourth attraction 56D. In this manner, the first guest group 54A may navigate regions of the amusement park 50 that are further away from the narrative endpoint 58 and may be occupied for a longer time. However, if the estimated wait time is short, the dynamic quest-based experience system 52 may provide a task that would lead the first guest group 54A toward an area proximate the narrative endpoint 58, such as toward the second attraction 56B. As such, after the wait time of the first guest group 54A has elapsed, the first guest group 54A may quickly navigate to the narrative endpoint 58.

Additionally or alternatively, the dynamic quest-based experience system 52 may provide a requested task to the first guest group 54A based on the number of other guests at each attraction 56 or at various regions of the amusement park 50. For instance, in the illustrated embodiment, the sensor 64 may determine that there are a greater number of guests at the fourth attraction 56D than at the third attraction 56C. Therefore, the dynamic quest-based experience system 52 may provide a task to the first guest group 54A to guide them toward the third attraction 56C and away from the larger crowd at the fourth attraction 56D. As such, the first guest group 54A may not have to wait to complete their requested task, thereby increasing the overall enjoyment of their dynamic quest-based narrative. Furthermore, the dynamic quest-based experience system 52 may provide a requested task to the first guest group 54A based on the performance or progress of other guest groups 54 in their respective dynamic quest-based narrative. Such performances may adjust the wait time of the first guest group 54A, and the dynamic quest-based experience system 52 may provide requested tasks based on the adjusted wait time. The dynamic quest-based experience system 52 may provide a dynamic queue for a narrative endpoint 58 that avoids congestion or too many guests being directed to the narrative endpoint 58 at one time. Further, the dynamic quest-based experience system 52 may also apply similar logic to the attractions 56 or locations associated with the individual tasks of the dynamic quest-based narrative. That is, the dynamic quest-based experience system 52 may select from a pool of available attractions 56 associated with one or more tasks of the narrative to build an individualized quest for each guest, whereby each task is selected to achieve a desired capacity and throughput.

In an example, after the first guest group 54A has completed their requested task, the dynamic quest-based experience system 52 may then determine the status of the second guest group 54B and/or or the fifth guest group 54E to determine if additional requested tasks are to be provided to the first guest group 54A. For instance, the dynamic quest-based experience system 52 may determine that the fifth guest group 54E is almost finished at the narrative endpoint 58 and/or the second guest group 54B is almost finished with their requested task. As a result, the dynamic quest-based experience system 52 may provide the first guest group 54A with a shorter or easier requested task in anticipation that the first guest group 54A will be rewarded with the narrative endpoint 58 soon. Contrarily, if the dynamic quest-based experience system 52 determines that the fifth guest group 54E is not almost finished at the narrative endpoint 58 and/or the second guest group 54B is not almost finished with their requested task, the dynamic quest-based experience system 52 may provide the first guest group 54A with a longer or more difficult requested task. Additionally, if the dynamic quest-based experience system 52 determines that the second guest group 54B has completed their requested task and is now at the narrative endpoint 58, the dynamic quest-based experience system 52 may not extend the wait time of the first guest group 54A. Instead, the dynamic quest-based experience system 52 may immediately direct the first guest group 54A toward the narrative endpoint 58 in anticipation that the second guest group 54B may be finished at the narrative endpoint 58 soon. Thus, the dynamic quest-based experience system 52 may extend or shorten each dynamic quest-based narrative based on the status of other guest groups 54, so as to move the guest groups 54 through virtual queue efficiently. The dynamic quest-based experience system 52 may monitor progress of the guest groups through the dynamic quest-based narrative based on one or more of locations of guest-associated devices, interaction with task-related items, and inputs of the guests via applications on the guest-associated devices or kiosks in the amusement park 50.

Figure 2:
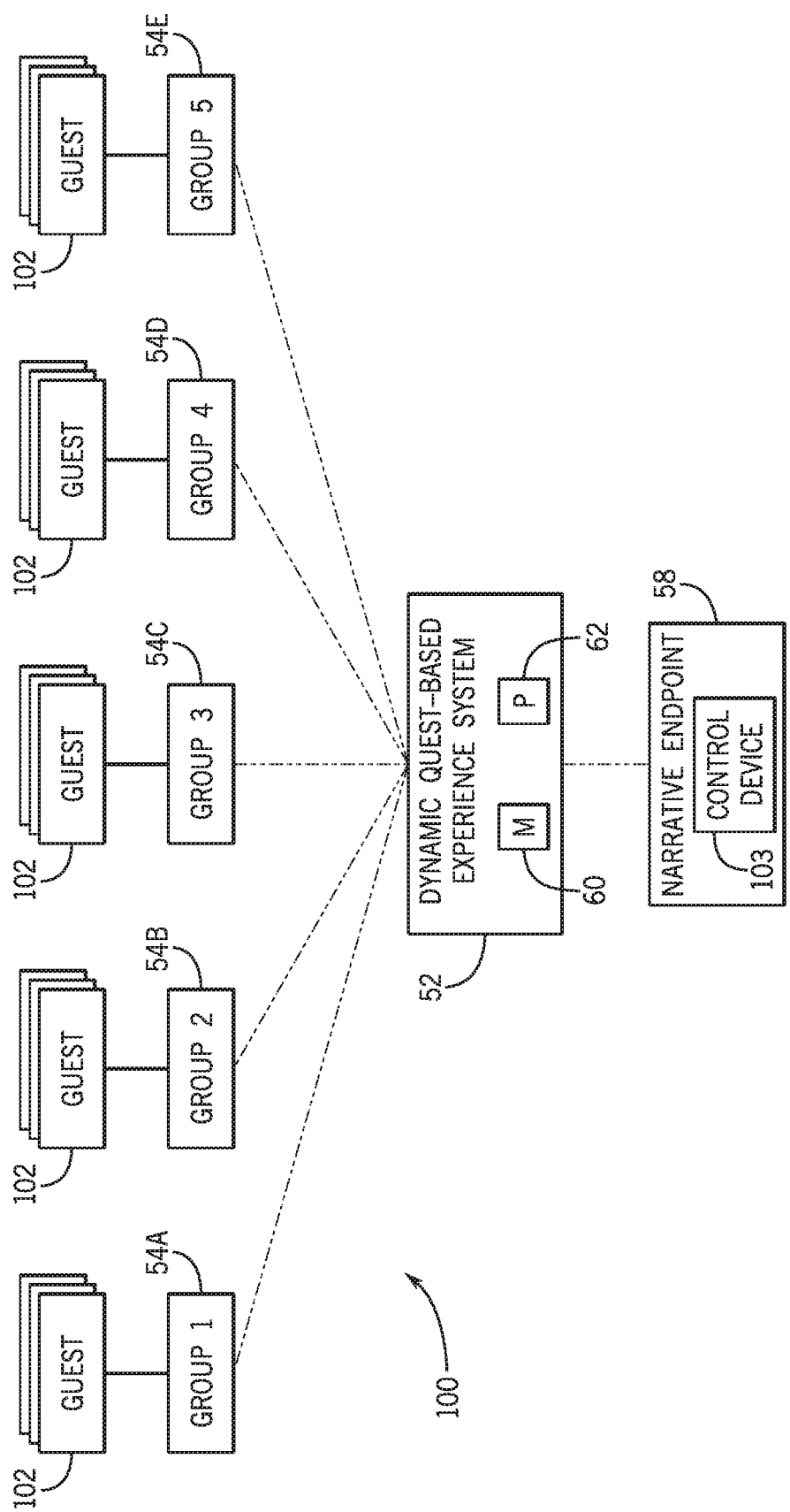
FIG. 2 is a schematic diagram of an embodiment of a communication system that communicatively couples the dynamic quest-based experience system, guest groups, and a narrative endpoint together, in accordance with an aspect of the present disclosure.

FIG. 2 is a schematic of an embodiment of a communication system 100 that communicatively couples the dynamic quest-based experience system 52, the guest groups 54, and the narrative endpoint 58 together. In the illustrated embodiment, each guest group 54 may include one or more guests 102 that are in communication with the dynamic quest-based experience system 52, which may simultaneously communicate with each guest group 54 and provide each guest group 54 with a respective dynamic quest-based narrative. As mentioned herein, the guest groups 54 may be placed in the virtual queue associated with the narrative endpoint 58 in an order based on when the guest group 54 initiated communication with the dynamic quest-based experience system 52. For example, if the first guest group 54A elected to participate in a particular dynamic quest-based narrative associated with the narrative endpoint 58 before the second guest group 54B elected to participate in another dynamic quest-based narrative associated with the narrative endpoint 58, the dynamic quest-based experience system 52 may place the first guest group 54A in the virtual queue before the second guest group 54B.

The dynamic quest-based experience system 52 may dynamically adjust the respective dynamic quest-based narratives based on the performances and/or statuses of the other guest groups 54. In one embodiment, the dynamic quest-based experience system 52 may adjust the order of the guest groups 54 in the virtual queue. As an example, the dynamic quest-based experience system 52 may determine that the second guest group 54B has completed a much greater quantity of requested tasks than the first guest group 54A has during their respective dynamic quest-based narratives. Thus, even though the first guest group 54A was initially ordered in the virtual queue before the second guest group 54B, the dynamic quest-based experience system 52 may reward the second guest group 54B with the narrative endpoint 58 before rewarding the first guest group 54A with the narrative endpoint 58, because of the stronger performance of the second guest group 54B.

In a certain embodiment, the dynamic quest-based experience system 52 may reward multiple guest groups 54 with the narrative endpoint 58 simultaneously. For instance, the narrative endpoint 58 may be an exclusive show that multiple guest groups 54 may view together. Thus, the dynamic quest-based experience system 52 may provide respective dynamic quest-based narratives that occupy multiple guest groups 54 with an end goal that the multiple guest groups finish all tasks at approximately the same time and arrive at the location of the narrative endpoint 58 together, regardless of when the guest groups entered their respective dynamic quest-based narratives. As a result, different guest groups 54 may be rewarded with and may experience the narrative endpoint 58 at the same time. In an additional or an alternative embodiment, the dynamic quest-based experience system 52 may provide dynamic quest-based narratives in which multiple guest groups 54 may participate. That is, more than one guest group 54 may work together to complete the same dynamic quest-based narrative and/or requested task, and each guest group 54 may be rewarded with the same or a different narrative endpoint 58.

Figure 3:
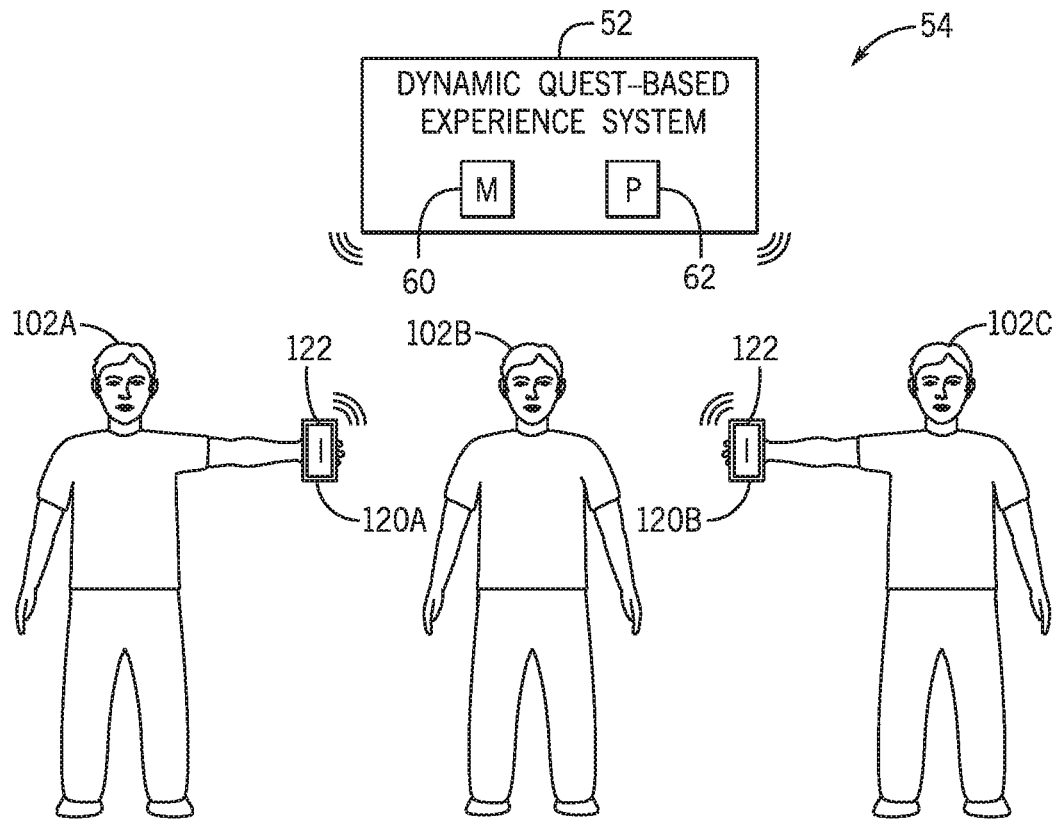
FIG. 3 is a schematic diagram of an embodiment of the dynamic quest-based experience system communicatively coupled to one of the guest groups, in accordance with an aspect of the present disclosure.

Furthermore, the dynamic quest-based experience system 52 may be in communication with a control device 103 (e.g., another computing device) associated with the narrative endpoint 58, such as an operator device, a kiosk, a sensor system, associated with the narrative endpoint 58 and that may communicate with the dynamic quest-based experience system 52 and/or one or more guest-associated computing devices (see FIG. 3). For example, after the first guest group 54A has completed a set of requested tasks in their dynamic quest-based narrative and has been rewarded with the narrative endpoint 58, the dynamic quest-based experience system 52 may transmit information associated with the completed set of requested tasks to the control device 103 of the narrative endpoint 58. The control device 103 may display information based on the transmitted information to create a more personalized interaction with the first guest group 54A. In an example, the narrative endpoint 58 may be a meet-and-greet with a mascot associated with the amusement park 50 (FIG. 1), and the dynamic quest-based experience system 52 may transmit information associated with the completed tasks to the control device 103 operated by the mascot or an assistant. Then, when the first guest group 54A interacts with the mascot, the mascot may discuss the various tasks with the first guest group 54A to provide a more engaging experience with the first guest group 54A. The control device 103 may also monitor arrival of guest groups 54 to the narrative endpoint 58 and provide feedback as to capacity and throughput such that the dynamic quest-based experience system 52 may dynamically adjust one or more tasks for one or more guest groups 54 based on deviations of the capacity and throughput from expected thresholds. For example, an expected capacity of the narrative endpoint 58 may be ten guest groups 54 per hour. If the narrative endpoint 58 is running at an actual capacity of six guest groups 54 per hour, the dynamic quest-based experience system 52 may dynamically adjust active guest groups 54 within the quest so that the guest groups 54 are slowed down and take longer to reach the narrative endpoint 58, so as to reduce the expected capacity of the narrative endpoint 58 from ten guest groups 54 per hour to the actual capacity of six guest groups 54 per hour. Further, the dynamic quest-based experience system 52 may redirect guest groups 54 to different narrative endpoints 58 or may add capacity at the narrative endpoint 58 to accommodate a greater quantity of guest groups 54 per hour.

Although the illustrated communication system 100 shows a single narrative endpoint 58 communicatively coupled to the dynamic quest-based experience system 52, the communication system 100 may be communicatively coupled to multiple narrative endpoints 58. The dynamic quest-based experience system 52 may then select a particular narrative endpoint 58 to be provided to the guest groups 54. As an example, each dynamic quest-based narrative may be associated with a specific narrative endpoint 58 and, therefore, the dynamic quest-based experience system 52 may provide the narrative endpoint 58 based on the dynamic quest-based narrative selected by the guest group 54. Additionally or alternatively, the dynamic quest-based experience system 52 may provide a certain narrative endpoint 58 based on a status of the guest group 54. As another example, the dynamic quest-based experience system 52 may provide a particular narrative endpoint 58 to the guest group 54 based on a number of times the guest group 54 has participated in a dynamic quest-based narrative. In this manner, the guest groups 54 may be rewarded with a different narrative endpoint 58 in each participation, further increasing the enjoyment of completing each dynamic quest-based narrative.

FIG. 3 is a schematic of an embodiment of the dynamic quest-based experience system 52 communicatively coupled to one of the guest groups 54. The illustrated guest group 54 has three guests 102, but the guest group 54 may alternatively have any suitable number of guests 102, such as one guest 102, two guests 102, or more than three guests 102. At least one of the guests 102 may have a computing device 120, such as a mobile phone, a touchpad, a device provided by the amusement park 50 (FIG. 1), another suitable device, or any combination thereof. As shown in FIG. 3, a first guest 102A has a first computing device 120A, a second guest 102B does not have a computing device 120, and the third guest 102C has a second computing device 120B. Each computing device 120 may have an application (e.g., mobile app) that enables the computing device 120 to communicate with the dynamic quest-based experience system 52, and each computing device 120 may have a user interface 122 (e.g., a touchscreen, a camera, a microphone) with which the guest 102 may interact to complete a requested task. In one embodiment, the application may be activated based on a geographic location of the computing device 120. Accordingly, the computing device 120 may include a global positioning system (GPS) receiver and/or communications circuitry configured to communicate with wireless transceivers in the amusement park 50 to provide location information of the computing device 120 to the dynamic quest-based experience system 52. For instance, the dynamic quest-based experience system 52 may determine if the computing device 120 is near or within the amusement park 50. In response to determining the computing device 120 is near or within the amusement park 50, the dynamic quest-based experience system 52 may send a notification to the computing device 120 via the application. The guests 102 may then use the application to select a dynamic quest-based narrative in which to participate. Further, the first task for each respective guest group 54, as each guest group 54 commences the dynamic quest-based narrative, may be selected based on a nearest possible task location or a nearest possible available task location.

In an example embodiment, the guest group 54 may participate in the dynamic quest-based narrative via a single one of the computing devices 120. By way of example, the dynamic quest-based experience system 52 may provide instructions or clues to just the first computing device 120A (e.g., to the user interface 122 of the first computing device 120A), and not the second computing device 120B. Thus, all members of the guest group 54 may use the first computing device 120A to complete the dynamic quest-based narrative. In an additional or an alternative embodiment, each computing device 120 may be used to participate in the dynamic quest-based narrative. For instance, the dynamic quest-based experience system 52 may provide unique instructions or clues to the first computing device 120A and to the second computing device 120B. The unique instructions or clues may be provided based on a particular role of the guest 102 associated with the computing device 120. As an example, the dynamic quest-based experience system 52 may provide a map to the first computing device 120A, and the first guest 102A may play a role of a navigator, and the dynamic quest-based experience system 52 may provide data information to the second computing device 120B, and the third guest 102B may play a role of a researcher. In this manner, the dynamic quest-based experience system 52 may provide a more challenging dynamic quest-based narrative that causes the different guests 102 of the guest group 54 to work together to complete the requested tasks of the dynamic quest-based narrative. To this end, the guest group 54 may communicate with the dynamic quest-based experience system 52 to input information associated with the number of guests 102 in the guest group 54 participating in the dynamic quest-based narrative. In the illustrated embodiment, since the second guest 102B does not have a computing device 120 that communicates with the dynamic quest-based experience system 52, the guest group 54 may input that there are two guests 102 participating, and the second guest 102B may help the first guest 102A and/or the third guest 102C.

The dynamic quest-based experience system 52 may then receive further information to enable the dynamic quest-based experience system 52 to coordinate and provide the respective information to the first computing device 120A and to the second computing device 120B. As an example, the first guest 102A may use the first computing device 120A to create a virtual room or a group on the application. The second guest 102B may then join the virtual room via the second computing device 120B, and the dynamic quest-based experience system 52 may communicate with the first computing device 120A and the second computing device 120B together. As another example, the first guest 102A may use the first computing device 120A to indicate that the second computing device 120B is to participate in the same dynamic quest-based narrative as the first computing device 120A. The dynamic quest-based experience system 52 may then communicate with the second computing device 120B to verify that the second computing device 120B is participating in the same dynamic quest-based narrative. If the second computing device 120B successfully verifies, the dynamic quest-based experience system 52 may then communicate with the first computing device 120A and the second computing device 120B together.

Figure 4:
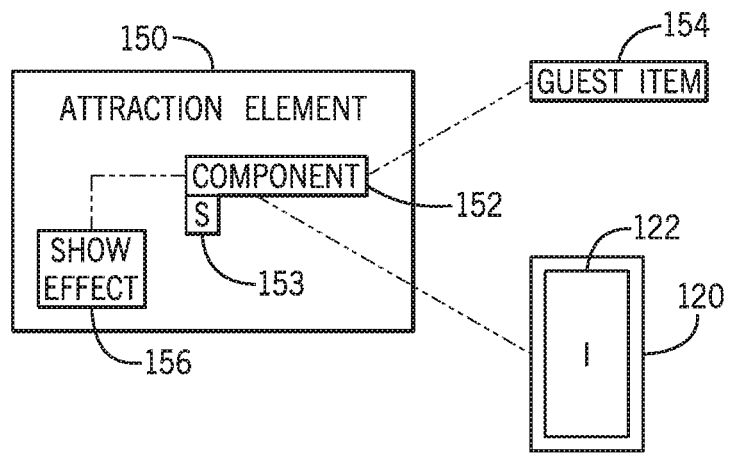
FIG. 4 is a schematic diagram of an embodiment of an attraction element of the amusement park configured to interact with various items to complete a task of a dynamic quest-based narrative, in accordance with an aspect of the present disclosure.

FIG. 4 is a schematic of an embodiment of an attraction element 150 of the amusement park 50 (FIG. 1) configured to be part of task instructions, such as to actively or passively interact with various items to complete a requested task of the dynamic quest-based narrative. For instance, the dynamic quest-based experience system 52 may instruct the guest group 54 (FIG. 1) to interact with the attraction element 150, which may be a prop associated with one of the attractions 56 (FIG. 1), a decoration located elsewhere in the amusement park 50, or any other suitable element in the amusement park 50. In one embodiment, the attraction element 150 includes a component 152 with which the guest group 54 may use to interact with the attraction element 150. As an example, the component 152 may be an identifier, such as a quick response (QR) code, a barcode, or the like, that the computing device 120 may read or scan. Additionally or alternatively, the component 152 may be a reader, such as a radio-frequency identification (RFID) reader, a near-field communication (NFC) reader, a microphone, a code scanner, or the like, configured to a read an identifier associated with the guest group 54 and/or the computing device 120. For instance, one of the guests 102 (FIG. 1) may scan an identifier displayed on the computing device 120 to the component 152. In another example, a guest item 154, such as an admission ticket, a wristband, or the like, may be used to interact with the component 152. In a further example, the component 152 may use facial recognition and/or audio recognition to identify a feature of a particular guest 102. The attraction element may be communicatively coupled to the dynamic quest-based experience system 52

(FIG. 1) and may transmit feedback to the dynamic quest-based experience system 52 indicative of a successful interaction.

In another example, the component 152 may include a sensor 153 that senses a type of interaction with the attraction element 150 (pushing a button, pulling a lever, standing on the sensor) and/or to indicate that the interaction has taken place (e.g., that the task has been completed). Information relating to interactions with the component 152 may be provided to the dynamic quest-based experience system 52. Based on the received feedback, the dynamic quest-based experience system 52 may then provide further instructions to the computing device 120 (e.g., to provide another requested task, to reward with the narrative endpoint 58 (FIG. 1), to indicate the interaction does not complete the requested task).

The attraction element 150 may also have a show effect 156 that is communicatively coupled to the component 152. The component 152 may be configured to transmit feedback to the show effect 156 indicative of a successful interaction, and the show effect 156 may be activated in response. By way of example, the show effect 156 may be configured to move, to emit a light, to play a sound, to output water, to perform another suitable action, or any combination thereof, in response to receiving the feedback. In this manner, the attraction element 150 may also appear to react to the interaction between the guest 102 and the component 152, thereby providing a more immersive and interactive experience for the guest 102.

Each attraction element 150 may be configured to introduce delay or advancement for the guest group 54 as instructed by the dynamic quest-based experience system 52 and based on monitoring of the progression of other guest groups 54 participating in the dynamic quest-based narrative. That is, the interactive components 152 of the attraction element 150, when present, may have different difficulty settings or time to completion settings, each associated with different estimated completion times.

Figure 5:
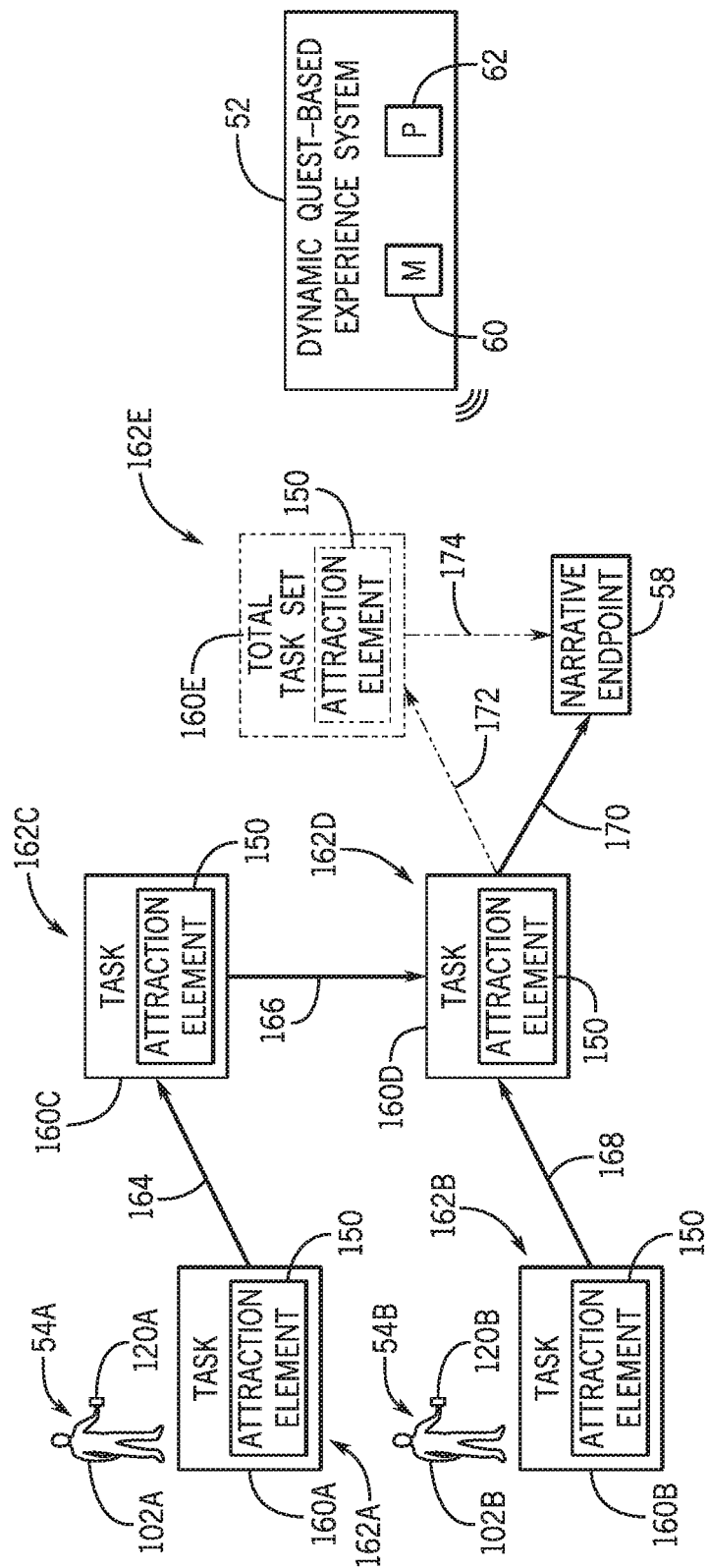
FIG. 5 is a schematic diagram of a series of tasks performed to reach the narrative endpoint, in accordance with an aspect of the present disclosure.

FIG. 5 is an example of a series of tasks 160 available within a dynamic quest-based narrative and distributed at various task locations 162 within the amusement park. The dynamic quest-based experience system 52 may assemble the dynamic quest-based narrative by generating a dynamic or initial subset of tasks 160 from a total set of tasks 160 in the amusement park for each guest group 54. The dynamic quest-based experience system 52 determines a desired arrival time for a new guest group 54 to the narrative endpoint 58 based on previously scheduled arrival times in the virtual queue. A desired estimated quest time is generated by the dynamic quest-based experience system 52 by using the desired arrival time and an initial time at which the guest 102 of the guest group 54 provided an indication of joining the dynamic quest-based narrative. In one example, a desired estimated quest time, which may be a difference between the desired arrival time and the initial time, is used to select an initial series of tasks 160 for each guest group 54. The selected initial series of tasks 160 is based on one or more parameters, including the desired estimated quest time, the initial guest group location, and/or guest profile information for the guest 102 of the guest group 54.

Each task 160 is associated with an estimated completion time and a respective location 162. Further, the set of tasks 160 may be selected based on as estimated travel times for routes (shown by arrows 164, 166, 168, 170, 172, 174) between the locations 162 of the successive tasks 160 and the narrative endpoint 58. Further, as noted, for tasks 160 that include interactive components (e.g., component 152 of FIG. 4), the interactive components may be dynamically tuned via instructions provided by the dynamic quest-based experience system 52 to adjust interactivity, which in turn may extend or shorten an estimated completion time of the associated task 160, further fine-tuning the dynamic quest-based narrative to fit the cumulative estimated time to the desired quest time. The sum of the estimated completion times for the selected series of tasks 160 as well as the estimated travel time may be selected to fit the desired quest time. The selection of the series of tasks 160 may be performed using rules-based logic by the dynamic quest-based experience system 52.

For example, respective guests 102 of the guest groups may indicate via a respective computing device 120 an interest in joining a dynamic quest-based narrative. Depending on sensed locations of the respective computing devices 120, the respective guests 102 may be directed to begin the dynamic quest-based narrative at a nearest available task 160. For example, the first guest 102A of the first guest group 54A is directed to a first task 160A at a first task location 162A based on a location of a first computing device 120A. The second guest 102B of the second guest group 54B is directed to a second task 160B at a second task location 162B based on a location of a second computing device 120B. Instructions associated with the first task 160A may be sent to the first computing device 120A of the first guest 102A while instructions associated with the second task 160B may be sent to the second computing device 120B of the second guest 102B.

After completion of the first task 160A by the first guest group 54A, the dynamic quest-based experience system 52 sends instructions relating to the third task 160C to the first computing device 120A, and the first guest group 54A generally travels along the route 164 to a third task location 162C. The dynamic quest-based experience system 52 may provide different instructions to the second guest group 54B after completion of their second task 160B and is instructed to proceed to a fourth task 160D at a fourth task location 162D. The dynamic quest-based experience system 52 receives updates relating to the locations of the guest computing devices 120 as well as check-ins or interactions at the respective attraction elements 150. Based on these real-time updates, the dynamic quest-based experience system 52 may alter the stored series of tasks 160 to dynamically fit the quest to the desired quest time. Further, the dynamic quest-based experience system 52 may receive real-time updates relating to travel times between tasks 160, estimated task completion times, and conditions at the narrative endpoint 58 such that estimates for uncompleted portions of the dynamic quest-based narrative may be updated and changed, and/or a desired arrival time may be updated. For example, the dynamic quest-based experience system 52 may instruct the first guest group 54A to proceed to the fourth task 160D after the first guest group 54A completes the third task 160C, and the dynamic quest-based experience system 52 may instruct the first guest group 54A to proceed to the narrative endpoint 58 after the first guest group 54A completes the fourth task 160D. However, if the narrative endpoint 58 is running later than scheduled, the dynamic quest-based experience system 52 may send instructions to the first guest group 54A to proceed to an additional task 160E at a fifth location 162E after the first guest group 54A completes the fourth task 160D, thereby dynamically updating the initial series of tasks 160 of the first guest group 54A to insert the additional task 160E and generate an updated series of tasks 160. The second guest group 54B may also be directed to additional or fewer tasks 160, depending on real-time information received by the dynamic quest-based experience system 52.

Figure 6:
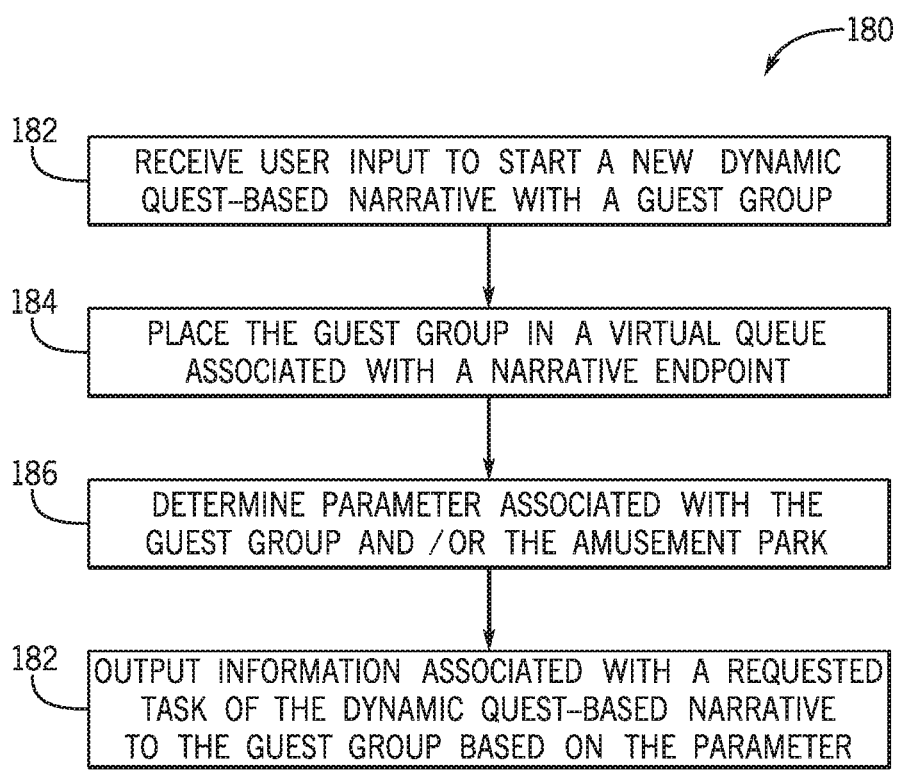
FIG. 6 is a flowchart of an embodiment of a method for providing a dynamic quest-based narrative to a guest group, in accordance with an aspect of the present disclosure.
Figure 7:
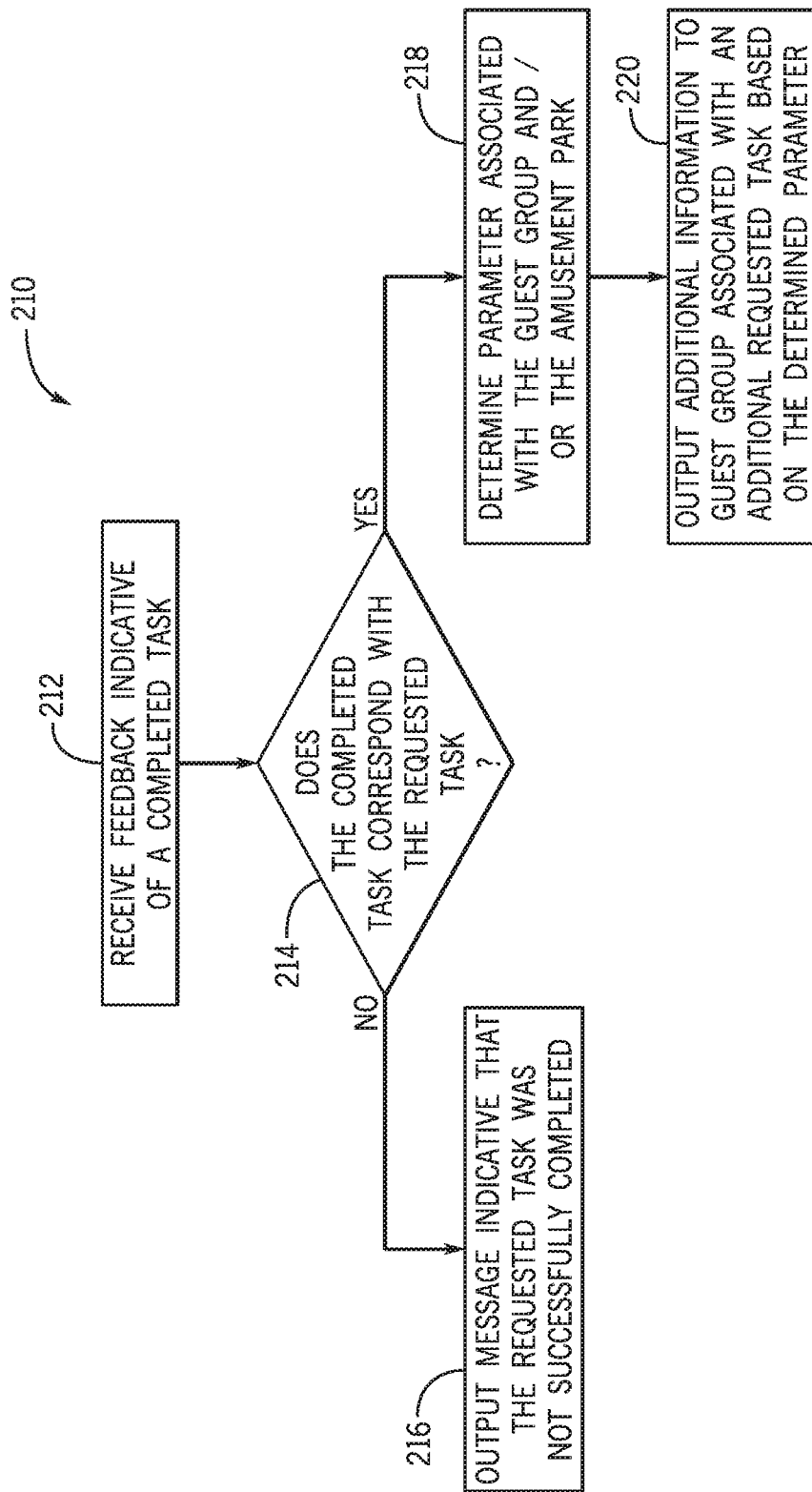
FIG. 7 is a flowchart of an embodiment of a method for responding to a completed task of a dynamic quest-based narrative, in accordance with an aspect of the present disclosure.
Figure 8:
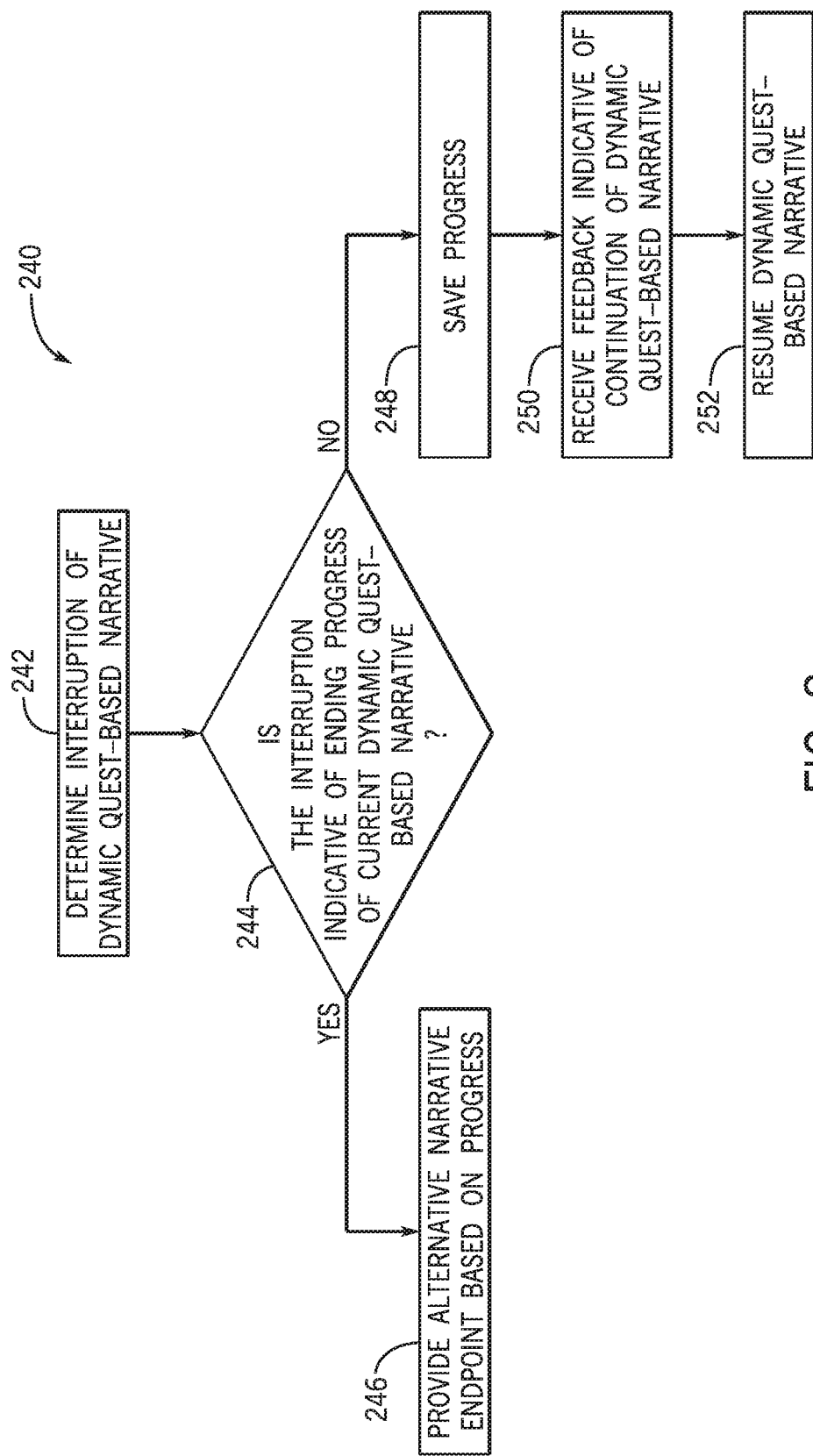
FIG. 8 is a flowchart of an embodiment of a method for responding to an interruption of a dynamic quest-based narrative, in accordance with an aspect of the present disclosure.

FIGS. 6-8 each illustrate a respective method or process that may be performed by the dynamic quest-based experience system 52 (e.g., by the processor 62) during a dynamic quest-based narrative. It should be noted that the steps of each method may be performed differently in other embodiments. For example, additional steps may be performed, or certain steps of each method may be modified, removed, or performed in a different order.

FIG. 6 is a flowchart of an embodiment of a method 180 for providing a dynamic quest-based narrative to the guest group. At block 182, the dynamic quest-based experience system receives a user input to start a new dynamic quest-based narrative. For example, the dynamic quest-based experience system may receive feedback from the computing device (e.g., via an application) indicating that a new dynamic quest-based narrative is to be initiated with the guest group associated with the computing device. Such feedback may include a selection of a particular desired dynamic quest-based narrative, the feedback may include a selection of a particular desired narrative endpoint, and/or the feedback may be a general indication that the guest group would like to participate in a dynamic quest-based narrative. In an embodiment, certain dynamic quest-based narratives and/or narrative endpoints may not be available unless guest information associated with one or more of the guests in the guest group indicates completion of a different dynamic quest-based narrative. In other words, the guest group has to participate and complete in previous dynamic quest-based narratives to unlock additional dynamic quest-based narratives and/or narrative endpoints to be readily available for selection.

At block 184, in response to receiving the user input to start a new dynamic quest-based narrative, the dynamic quest-based experience system places the guest group (e.g., an identifier associated with one of the computing devices of the guest group) in a virtual queue of an associated narrative endpoint. As an example, there may already be other guest groups present in the virtual queue. Therefore, the dynamic quest-based experience system may place the guest group behind the other guest groups. Generally, the virtual queue manages when the guest group may be rewarded with the narrative endpoint and may be used by the dynamic quest-based experience system to operate the dynamic quest-based narrative.

At block 186, the dynamic quest-based experience system may then determine a parameter associated with the guest group and/or with the amusement park. As an example, the parameter may be associated with a number of guests in the guest group participating in the dynamic quest-based narrative, a current location of the guest group, an experience level or number of times the guest group has participated in a dynamic quest-based narrative, an age range of the guest group, another suitable information associated with the guest group, or any combination thereof. As another example, the parameter may be associated with a time of day, a population density at various regions of the amusement park, the dynamic quest-based narratives participated in by other guest groups in the amusement park, an estimated length of the queue line, or any other suitable parameter. The parameter may be determined via feedback transmitted by the computing device, transmitted by the sensor communicatively coupled to the dynamic quest-based experience system, or both.

At block 188, based on the determined parameter, the dynamic quest-based experience system may output information to the guest group to complete a requested task of the dynamic quest-based narrative. For example, the information may include instructions that directly prompt the guest group to perform the requested task. The information may additionally or alternatively include clues that the guest group has to interpret or decipher and/or a question that the guest group has to answer (e.g., by visiting certain areas of the amusement park) to complete the requested task. In one embodiment, each dynamic quest-based narrative may include a plurality of sets of information that may be sent to the guest group. The dynamic quest-based experience system may use the determined parameter to select a particular set of information from the plurality of sets of information to send to the guest group. For instance, the dynamic quest-based experience system may send a set of information that causes the guest group to navigate away from densely populated regions of the amusement park and/or away from other guest groups that are also participating in a dynamic quest-based narrative. As such, the guest group may avoid large crowds to experience a more pleasant dynamic quest-based narrative. The dynamic quest-based experience system may also send information associated with a certain requested task having a difficulty level and/or a length of completion based on the parameter. For example, the dynamic quest-based experience system may send a requested task that takes a longer time to complete upon determining that the guest group has a long wait time. Thus, the guest group may be occupied during the entire wait time. The dynamic quest-based experience system may further send information that may be tailored to the demographics of the guest group, such as to the expertise of the guest group and/or of various preferences (e.g., preferred type of requested tasks to complete, preferred difficulty of requested tasks). As such, the guest group may experience a more fulfilling and interactive dynamic quest-based narrative.

As discussed herein, the dynamic quest-based experience system may output a single set of information to each computing device of the guest group. Thus, each guest of the guest group receives the same information. Additionally or alternatively, the dynamic quest-based experience system may output a different set of information to certain computing devices of the guest group. As such, the guests of the guest group may receive unique pieces of information (e.g., based on an assigned role of the guest), which may create a more immersive experience for the guest group.

FIG. 7 is a flowchart of an embodiment of a method 210 for responding to a completed task. The method 210 may be performed after sending the set of information associated with a requested task and may be used to determine the progression of the dynamic quest-based narrative. At block 212, the dynamic quest-based experience system receives feedback indicative of a completed task. In one embodiment, the dynamic quest-based experience system may receive the feedback via the attraction element based on an interaction between the component of the attraction element and one of the guests of the guest group (e.g., the component of the attraction element reading an identifier of the guest group). Additionally or alternatively, the dynamic quest-based experience system may receive the feedback from the guest group directly, such as via the computing device (e.g., upon reading the component of the attraction element).

At block 214, the dynamic quest-based experience system determines if the completed task corresponds with the requested task. In other words, the dynamic quest-based experience system determines if the completed task successfully completes the requested task that is associated with the set of information sent to the guest group. If the dynamic quest-based experience system determines that the completed task does not correspond with the requested task, the dynamic quest-based experience system may output a message to the guest group indicative that the requested task was not successfully completed, as shown at block 216. For instance, the dynamic quest-based experience system may output a notification to the computing device of the guest group to inform the guest group that the requested task has not been completed. As such, the requested task remains pending, and the guest group may continue to work toward completing the requested task.

At block 218, in response to determining that the completed task does correspond with the requested task, the dynamic quest-based experience system may determine another parameter associated with the guest group and/or the amusement park. That is, the dynamic quest-based experience system determines that the guest group has successfully completed the requested task and, as a result, a further set of information is to be sent to the guest group. To determine what set of information to send to the guest group, the dynamic quest-based experience system may determine an update of any of the parameters mentioned herein (e.g., with reference to block 186 of FIG. 5).

At block 220, based on the determined parameter, the dynamic quest-based experience system outputs an additional set of information to the guest group to complete an additional requested task. This step may be similar to the step described at block 188, in that the dynamic quest-based experience system tailors the additional set of information to the guest group to provide a more personalized dynamic quest-based narrative. In one embodiment, the dynamic quest-based experience system may also output a message that informs the guest group that the requested task was successfully completed. The dynamic quest-based experience system then selects another set of information to provide to the guest group. For example, the dynamic quest-based experience system may estimate that there is still a wait time before the guest group may be rewarded with the narrative endpoint and, therefore, the dynamic quest-based experience system may provide the additional set of information associated with the additional requested task based on the estimated wait time. If the dynamic quest-based experience system determines that the wait time has elapsed, the additional set of information provided by the dynamic quest-based experience system may reward the guest group with the narrative endpoint. In further examples, the dynamic quest-based experience system may provide the additional set of information based on an updated determination of the population density of the amusement park, based on the previously completed task(s) of the dynamic quest-based narrative, and the like.

FIG. 8 is a flowchart of an embodiment of a method 240 for responding to an interruption of the dynamic quest-based narrative. As discussed herein, an interruption includes any event that pauses progression of the dynamic quest-based narrative. At block 242, the dynamic quest-based experience system determines that there is an interruption of the dynamic quest-based narrative. Examples of an interruption include a desire from the guest group to pause the dynamic quest-based narrative, inclement weather, unavailability of certain attractions (e.g., for maintenance), another suitable event, or any combination thereof, that may affect progression of the dynamic quest-based narrative. In one example embodiment, the dynamic quest-based experience system may determine the interruption upon receiving feedback from the computing device, such as a user input that manually pauses the dynamic quest-based narrative. In an additional or an alternative example embodiment, the dynamic quest-based experience system may determine the interruption based on an inactivity of the guest group. That is, the dynamic quest-based experience system may determine that no feedback has been received from the computing device associated with the guest group for a threshold interval of time. The dynamic quest-based experience system may then automatically determine that the inactivity is indicative of an interruption of the dynamic quest-based narrative. In a further example embodiment, the dynamic quest-based experience system may determine the interruption based on feedback from the sensor communicatively coupled to the dynamic quest-based experience system. The feedback may indicate a current weather condition, the status of attractions of the amusement park, and so forth.

At block 244, the dynamic quest-based experience system determines if the interruption is indicative of ending the current progress of the dynamic quest-based narrative. For instance, if the interruption is associated with an inactivity of the guest group, the dynamic quest-based experience system may send a message to the computing device requesting for further action to determine if the guest group desires to continue progress of the dynamic quest-based narrative. If the dynamic quest-based experience system does not receive further feedback (e.g., within a certain time interval) from the guest group, then the dynamic quest-based experience system may determine the interruption indicates the ending of the progress of the dynamic quest-based narrative. Additionally or alternatively, the dynamic quest-based experience system may determine the interruption is indicative of ending the progress of the dynamic quest-based narrative if the dynamic quest-based experience system receives feedback indicative of the guest group no longer wanting to progress the dynamic quest-based narrative. Such feedback may be a user input received via the computing device and may indicate quitting the dynamic quest-based narrative, for example. Further, the dynamic quest-based experience system may determine the interruption is indicative of ending the progress of the dynamic quest-based narrative if the dynamic quest-based experience system determines that feedback received from the sensor will substantially pause, restrict, or otherwise affect progression of the dynamic quest-based narrative. As an example, such feedback may indicate prolonged inclement weather in the surrounding area of the amusement park.

At block 246, if the dynamic quest-based experience system determines that the interruption does indicate ending progress of the current dynamic quest-based narrative, the dynamic quest-based experience system may provide an alternative narrative endpoint. The alternative narrative endpoint may be any endpoint that is not the narrative endpoint associated with the dynamic quest-based narrative, and the alternative narrative endpoint may be provided based on the progress of the guest group in the dynamic quest-based narrative. As an example, the alternative narrative endpoint may include a reward, such as a souvenir, a discount, a voucher, a bypass of a queue for one of the attractions, and the like. In this manner, the guest group is still rewarded for their participation in the dynamic quest-based narrative and may be motivated to participate in future dynamic quest-based narratives despite the occurrence of the interruption. However, if the dynamic quest-based experience system determines that the guest group has not sufficiently progressed through the dynamic quest-based narrative, the dynamic quest-based experience system may not provide any narrative endpoint to the guest group. As such, the guest group may have to complete a certain number of tasks or may have to put in sufficient work toward one of the requested tasks to be qualified for receiving the alternative narrative endpoint. In either case, the dynamic quest-based experience system may end the progress of the current dynamic quest-based narrative. Therefore, the guest group may restart the dynamic quest-based narrative anew. The dynamic quest-based experience system may also dynamically update the task instructions for other guests based on individual guests leaving the dynamic quest-based narrative.

If the dynamic quest-based experience system determines that the interruption does not indicate ending the progress of the current dynamic quest-based narrative, then the dynamic quest-based experience system may save the progress, as indicated at block 248. For instance, the dynamic quest-based experience system may receive feedback indicating that the guest group still wishes to progress through the dynamic quest-based narrative after the interruption (e.g., via a user input). Additionally or alternatively, the dynamic quest-based experience system may receive feedback from the sensor that indicates the parameter will not substantially affect progression of the dynamic quest-based narrative. In one example, the feedback may indicate that the weather is predicted to be briefly inclement and will merely cause a temporary interruption. As a result, the dynamic quest-based experience system will not end progress of the dynamic quest-based narrative in anticipation that the guest group will be able to participate in the dynamic quest-based narrative again shortly. For this reason, the dynamic quest-based experience system saves the progress of the dynamic quest-based narrative to enable the guest group to resume participation of the dynamic quest-based narrative, such as at the previously pending requested task.

At block 250, the dynamic quest-based experience system receives feedback indicative of the continuation of the dynamic quest-based narrative. For example, the guest group provides a user input via the computing device to indicate the desire to continue progression of the dynamic quest-based narrative. In another example, the dynamic quest-based experience system may receive feedback from the sensor indicative of the parameter no longer affecting the progress of the dynamic quest-based narrative.

At block 252, in response to receiving feedback indicative of the continuation of the dynamic quest-based narrative, the dynamic quest-based experience system resumes the dynamic quest-based narrative. The dynamic quest-based experience system may resume the dynamic quest-based narrative based on the progress saved with reference to block 248. That is, the guest group may continue participating in the dynamic quest-based narrative at the progression prior to the interruption of the dynamic quest-based narrative. As such, the guest group does not have to redo requested tasks that were already completed and may be more motivated to continue participating in the dynamic quest-based narrative.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A quest-based experience system of an amusement park, the quest-based experience system comprising:
   a prop comprising a sensor configured to detect a user interaction with the prop, wherein the prop is configured to transmit feedback in response to detecting the user interaction via the sensor;
   a memory storing instructions; and
   a processor configured to execute the instructions to cause the processor to:
      receive a user input from a computing device, the user input indicative of starting a quest-based narrative, wherein the quest-based narrative comprises a plurality of sets of information;
      place an identifier associated with the computing device in a virtual queue associated with a narrative endpoint of the amusement park based on the user input;
      select a first set of information from the plurality of sets of information based on a determined parameter, wherein the first set of information is associated with a first requested task corresponding to the prop;
      output the first set of information to the computing device;
      receive the feedback from the prop, wherein the feedback is indicative of the user interaction with the prop, and the user interaction corresponds to the identifier associated with the computing device;
      determine a completion of the first requested task based on the feedback received from the prop;
      select a second set of information from the plurality of sets of information in response to determining the completion of the first requested task, wherein the second set of information is associated with a second requested task; and
      output the second set of information to the computing device.

2. The quest-based experience system of claim 1, wherein the processor is configured to execute the instructions to cause the processor to:
   determine a wait time associated with the virtual queue upon determining the completion of the first requested task based on the feedback received from the prop;
   select the second set of information from the plurality of sets of information based on an estimated time to complete the second requested task associated with the second set of information and the wait time associated with the virtual queue.

3. The quest-based experience system of claim 1, wherein the second requested task is associated with access to the narrative endpoint.

4. The quest-based experience system of claim 1, wherein the processor is configured to execute the instructions to cause the processor to:
   receive additional feedback after outputting the second set of information to the computing device, wherein the additional feedback is indicative of a completed task;
   determine the completed task does not correspond with the second requested task; and output a message to the computing device in response to determining the completed task does not correspond with the second requested task, the message indicative of the second requested task not being successfully completed in response to determining the completed task does not correspond with the second requested task.

5. The quest-based experience system of claim 1, wherein the processor is configured to execute the instructions to cause the processor to transmit additional feedback to the narrative endpoint, wherein the additional feedback comprises information associated with the completion of the first requested task and the identifier associated with the computing device.

6. The quest-based experience system of claim 1, wherein the narrative endpoint comprises a limited capacity attraction, a discount, an access to a restricted area, a special edition of an attraction, a souvenir, a voucher, or any combination thereof, of the amusement park.

7. The quest-based experience system of claim 1, wherein the determined parameter is associated with a wait time of the virtual queue, a time of day, a weather condition, a population density of a region of the amusement park, a number of users associated with the computing device, a location of the computing device, an experience level of a user associated with the computing device, a status of other computing devices participating in other quest-based narratives, or any combination thereof.

8. An amusement park system, comprising:
at least one interactive element, wherein the at least one interactive element is configured to provide feedback indicative of a completed task;
a quest-based experience system configured to:
receive an input transmitted from a computing device of a user at an initial time, wherein the input is indicative of starting a quest-based narrative;
place the user in a virtual queue associated with an endpoint of the quest-based narrative;
determine a desired time for the user to arrive at a location of the endpoint of the quest-based narrative, wherein the desired time is based on an availability at the endpoint;
select a first task to be completed by the user based on a first estimated time to complete the first task, the initial time at which the input was received from the computing device, and the desired time for the user to arrive at the location of the endpoint;
output the first task to the computing device;
receive the feedback indicative of the completed task from the at least one interactive element at an updated time;
determine the completed task corresponds to the first task based on the feedback;
select a second task to be completed by the user in response to determining the completed task corresponds to the first task and based on a second estimated time to complete the second task, the updated time at which the feedback indicative of the completed task was received from the at least one interactive element, and the desired time for the user to arrive at the location of the endpoint; and
output the second task to the computing device.

9. The amusement park system of claim 8, wherein the quest-based experience system is configured to:
receive additional feedback indicative of completion of the second task at an additional updated time;
determine a difference between the additional updated time and the desired time is below a threshold; and
output, to the computing device, a message indicative of enabled access to the endpoint of the quest-based narrative in response to determining that the difference between the additional updated time and the desired time is below the threshold.

10. The amusement park system of claim 8, wherein the quest-based experience system is configured to:
receive additional feedback indicative of completion of the second task at an additional updated time;
adjust the desired time to an updated desired time for the user to arrive at the location of the endpoint after receiving the additional feedback indicative of the completion of the second task; and
select a third task based on a third estimated time to complete the third task, the additional updated time at which the additional feedback indicative of the completion of the second task was received, and the updated desired time.

11. The amusement park system of claim 10, wherein the quest-based experience system is configured to receive the additional feedback from the computing device of the user.

12. The amusement park system of claim 8, wherein the at least one interactive element comprises a reader configured to read an identifier associated with the user and to provide the feedback indicative of the completed task to the quest-based experience system upon reading the identifier associated with the user.

13. The amusement park system of claim 12, wherein the at least one interactive element comprises a show effect communicatively coupled to the reader, wherein the reader is configured to transmit, to the show effect, additional feedback indicative of an interaction upon reading the identifier associated with the user, and wherein the show effect is configured to activate upon receiving the additional feedback indicative of the interaction.

14. The amusement park system of claim 8, wherein the at least one interactive element comprises an identifier that is readable to the computing device, wherein the computing device is configured to transmit additional feedback indicative of the completed task in response to reading the identifier of the at least one interactive element, and wherein the quest-based experience system is configured to receive the additional feedback indicative of the completed task from the computing device.

15. The amusement park system of claim 8, wherein the input transmitted from the computing device comprises a selection of the endpoint, and wherein the quest-based experience system is configured to select the first task and the second task based on the endpoint.

16. The amusement park system of claim 8, wherein the quest-based experience system is configured to:
determine a location of the computing device of the user; and
determine the first estimated time to complete the first task, the second estimated time to complete the second task, or both based on the location of the computing device.

17. A controller for an amusement park system, the controller comprising a tangible, non-transitory, computer-readable medium having computer-executable instructions stored thereon that, when executed, are configured to cause one or more processors to:
receive a user input from a computing device of a guest group of the amusement park system, wherein the user input is indicative of starting a quest-based narrative, and wherein the quest-based narrative comprises a plurality of sets of information;

place the guest group in a virtual queue associated with a narrative endpoint of the amusement park;

determine a wait time associated with the virtual queue for accessing the narrative endpoint;

select a first set of information from the plurality of sets of information based on a first estimated time to complete a first task associated with the first set of information and the wait time associated with the virtual queue;

output the first set of information to the computing device upon selecting the first set of information;

receive feedback indicative of completion of the first task associated with the first set of information;

determine an updated wait time in response to receiving the feedback indicative of the completion of the first task;

in response to determining the updated wait time is above a threshold, select a second set of information from the plurality of sets of information based on a second estimated time to complete a second task associated with the second set of information and the updated wait time associated with the virtual queue;

output the second set of information to the computing device upon selecting the second set of information; and in response to determining the updated wait time is below the threshold, output a message indicative of enabled access of the narrative endpoint to the computing device.

18. The controller of claim 17, wherein the computer-executable instructions, when executed, are configured to cause the one or more processors to:

determine an interruption of the quest-based narrative;

determine if the interruption is indicative of ending progress of the quest-based narrative; and output a message indicative of enabled access of an alternative narrative endpoint to the computing device based on a progression of the quest-based narrative in response to determining the interruption is indicative of ending the progress of the quest-based narrative.

19. The controller of claim 17, wherein the computer-executable instructions, when executed, are configured to cause the one or more processors to:

determine an interruption of the quest-based narrative;

determine if the interruption is indicative of ending progress of the quest-based narrative;

save the progress of the quest-based narrative in response to determining the interruption is not indicative of ending the progress of the quest-based narrative;

receive feedback indicative of a continuation of the quest-based narrative; and resume the quest-based narrative in response to receiving the feedback indicative of the continuation of the quest-based narrative.

20. The controller of claim 19, wherein the interruption comprises a manual pause of the quest-based narrative, an inactivity of the guest group, a weather condition, an unavailability of an attraction of the amusement park system, or any combination thereof.

* * * * *